(12) United States Patent
Natarajan

(10) Patent No.: US 10,535,030 B2
(45) Date of Patent: Jan. 14, 2020

(54) GLOBAL BENCHMARKING FOR A TERMINAL AUTOMATION SOLUTION

(71) Applicant: HONEYWELL INTERNATIONAL INC., Morris Plains, NJ (US)

(72) Inventor: Ramesh Murugan Natarajan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 368 days.

(21) Appl. No.: 15/419,404

(22) Filed: Jan. 30, 2017

(65) Prior Publication Data

US 2018/0218307 A1  Aug. 2, 2018

(51) Int. Cl.
*G06Q 50/06* (2012.01)
*G06Q 10/06* (2012.01)

(52) U.S. Cl.
CPC ....... *G06Q 10/06393* (2013.01); *G06Q 50/06* (2013.01)

(58) Field of Classification Search
None
See application file for complete search history.

(56) References Cited

U.S. PATENT DOCUMENTS

| | | |
|---|---|---|
| 6,370,515 B1 | 4/2002 | Diamond et al. |
| 2001/0034567 A1* | 10/2001 | Allen .................. G06F 8/65 700/283 |
| 2003/0195653 A1* | 10/2003 | Lewis ................ F02D 41/2493 700/236 |
| 2006/0020502 A1 | 1/2006 | Trout et al. |
| 2009/0055304 A1 | 2/2009 | Lange |
| 2011/0071963 A1* | 3/2011 | Piovesan ................ G06Q 10/00 706/11 |
| 2014/0222527 A1* | 8/2014 | Allison ............ G06Q 10/06393 705/7.39 |
| 2015/0317591 A1* | 11/2015 | Pantaleano ...... G06Q 10/06393 705/7.39 |
| 2016/0180475 A1 | 6/2016 | Phillips et al. |

FOREIGN PATENT DOCUMENTS

KR  20040106423 A  12/2004

OTHER PUBLICATIONS

Dr. Brad Wood, "Benchmarking helps drive terminal performance", 81723 Petroleum Review, Jul. 21, 2008, pp. 33-35.

* cited by examiner

Primary Examiner — Thomas L Mansfield

(57) ABSTRACT

A method of automated remote terminal benchmarking includes providing a computing system including a processor having an associated memory which implements a benchmarking algorithm. The benchmarking algorithm implements receiving raw data associated with a plurality of Key Performance Indicator (KPIs) including real-time data from different bulk liquid terminals spanning sites across a plurality of continents, and calculating a global target benchmark value or global target benchmark range for at least a first of the plurality of KPIs from the raw data. Responsive to a user' request at a selected first of the different bulk liquid terminal (first terminal), a benchmark report is generated which benchmarks a KPI performance of the first terminal including for the first KPI by a comparison to the global target benchmark value or global target benchmark range.

8 Claims, 4 Drawing Sheets

GLOBAL BENCHMARKING FOR A TERMINAL AUTOMATION SOLUTION

FIELD

Disclosed embodiments relate benchmark testing for bulk liquid terminals.

BACKGROUND

Benchmarking is a process of comparing one's business processes and performance metrics to industry bests and/or best practices from other industries. Benchmarking involves management identifying the best firms in their industry, or any other industry where similar processes exist, and comparing the results and processes of those studied (the "targets") to one's own results and processes to learn how well the targets perform and, more importantly, how they do it. The concept of "best practice benchmarking" or "process benchmarking" helps organizations to evaluate various aspects of their processes in relation to best practice companies' processes, usually within a peer group defined for the purposes of comparison. This then allows organizations to develop plans on how to make improvements or adapt specific best practices, usually with the aim of increasing some aspect of performance. Benchmarking may be a one-off event, but is often treated as a continuous process in which organizations continually seek to improve their practices to help them achieve business excellence.

The benchmarking process for storage and loading liquid terminals has generally lacked a systematic approach. With the advancement in IT tools and technologies, the benchmarking efforts can be more cohesive, more aligned towards vision and mission of oil storage and distribution companies. There are several challenges, which are faced during benchmarking exercise, viz. disparate data sources resulting from silo IT implementations, more efforts spent on collecting and compiling data rather than on validating and analyzing them, no standardization of existing processes across corporation, data quality issues, lot of time consuming manual efforts, no standard process for opportunity capture and follow through.

The ability to compare the performance of various industrial terminal facilities such as oil and gas facilities includes terminals which may comprise tank farms (a collection of storage tanks located on the same site) and a plurality of loading bays. A given company may have multiple sites for their terminals. Honeywell International provides a commercially available TERMINAL MANAGER product which is a web-based solution for facilitating, monitoring and controlling the distribution of products in a bulk terminal. The TERMINAL MANAGER monitors and controls all critical processes to ensure smooth and safe terminal operation, with each module designed and engineered for deployment in challenging business environments. Honeywell International also provides an integrated Terminal Automation Solution (TAS) which is a suite that manages product movement through the tank farm, loading bays, and enables enhanced plant safety through integration with fire and gas systems and camera surveillance.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize Key Performance Indicators (KPIs) at a particular bulk liquid terminal (hereafter "terminals") are not compared with global terminal benchmark data to evaluate the performance of terminal operations at a given terminal. A continuous automated remote benchmarking solution that uses global terminal benchmark data for terminals is believed to be not available.

Disclosed embodiments provide bulk liquid terminal benchmarking services where global KPI values or ranges are calculated and updated based on raw data including real-time data received from globally distributed (i.e., across multiple continents) terminals which enables benchmarking terminal performance for any of the terminals against different terminals across the globe. Disclosed global benchmarking allows organizations to develop plans regarding how to make improvements or change specific practices to help drive improved terminal performance and thus profitability.

DETAILED DESCRIPTION

Figure 1:
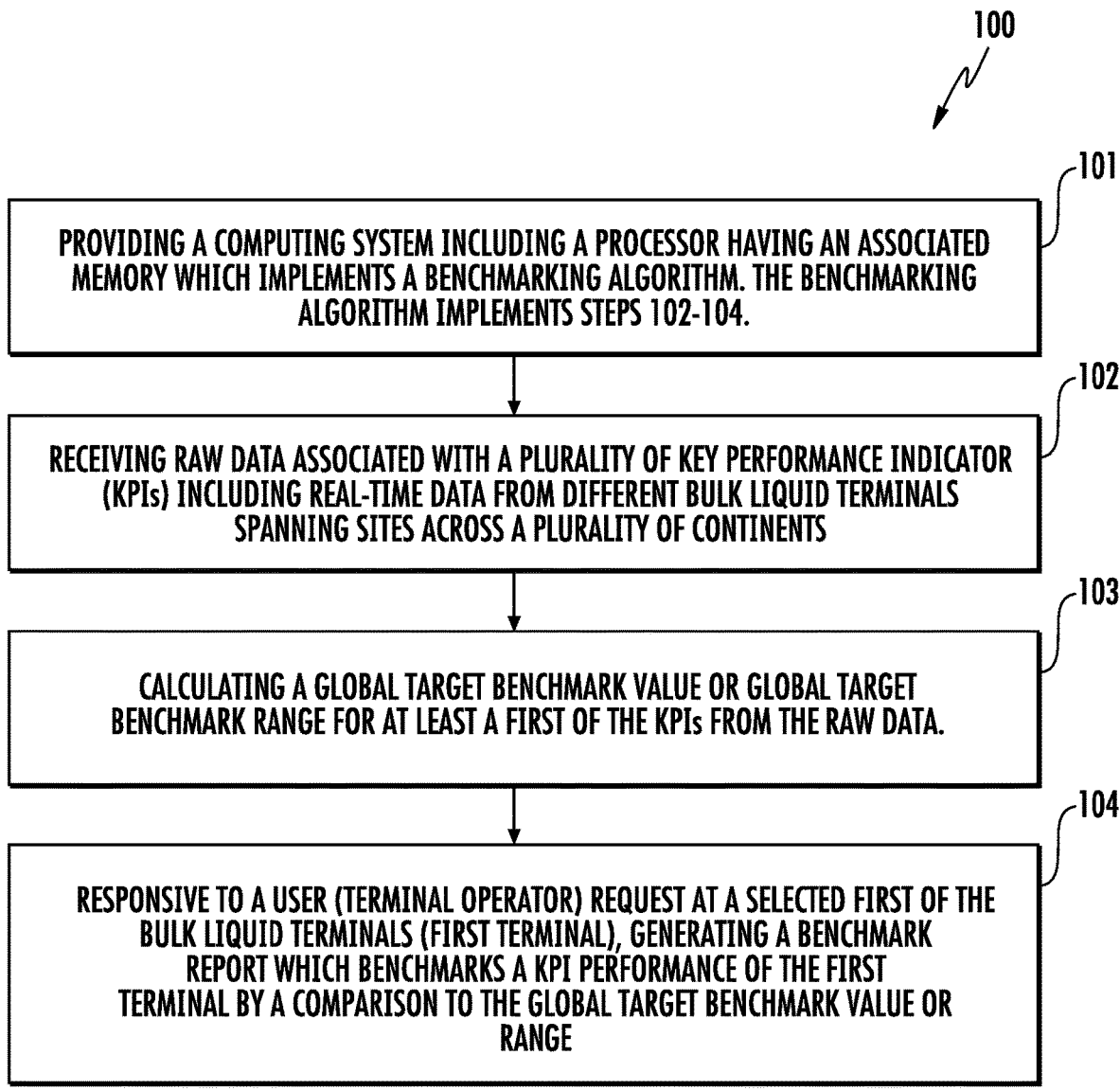
FIG. 1 is a flow chart showing steps in an example method of automated remote global terminal benchmarking, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a flow chart showing steps for an example method 100 of automated remote terminal benchmarking, according to an example embodiment. Step 101 comprises providing a computing system including a processor having an associated memory which implements a benchmarking algorithm, where the benchmarking algorithm implements steps 102-104 described below. The processor can comprise a microprocessor, digital signal processor (DSP), or a microcontroller unit (MCU). Step 102 comprises receiving raw data associated with a plurality of KPIs including real-time data from different bulk liquid terminals which span a plurality of different continents. The KPI(s) used are those identified which capture the major performance outputs of the selected processes. The terminals can be involved in various modes of transport such as surface, rail, marine and pipeline. The raw data generally includes at least in part real-time updating.

Step 103 comprises calculating a global target benchmark value or global target benchmark range for at least a first of the plurality of KPIs from the raw data. Step 104 comprises responsive to a user' (typically a terminal operator's) request at a selected first of the bulk liquid terminals (first terminal), a global benchmark report is generated which benchmarks a KPI performance of the first terminal by a comparison of one or more KPIs to the global target benchmark value or range. This enables the terminal operator to evaluate a performance of the KPI(s) at the first terminal relative to a global target benchmark value or global target benchmark range. The benchmark report can display alerts or warnings based on the amount of KPI deviation from the global target benchmark value or range. Using the benchmark report in response to observing significant deviations (which may be predetermined deviations, such as based on percentage deviations) from global the target benchmark value or global target benchmark range predetermined targets, the terminal operator can perform corrective actions.

Disclosed methods provide a current scenario assessment where the benchmarking allows a given terminal operator to determine the current terminal performance by comparing one or more KPI values to a desired level given by global target benchmark value or global target benchmark range. This provides improve terminal performance because once a target is set for KPIs, then over the period of time those KPIs can be closely monitored against those targets and steps can be taken to enable meeting those targets hence resulting in improvement in terminal performance. Benchmarking should generally be performed so that the benchmark report is made available on an essentially real-time basis to reflect KPIs that should be monitored on a minute-to-minute basis, although some KPIs can be monitored on an hourly, daily, weekly or monthly basis.

Figure 4:
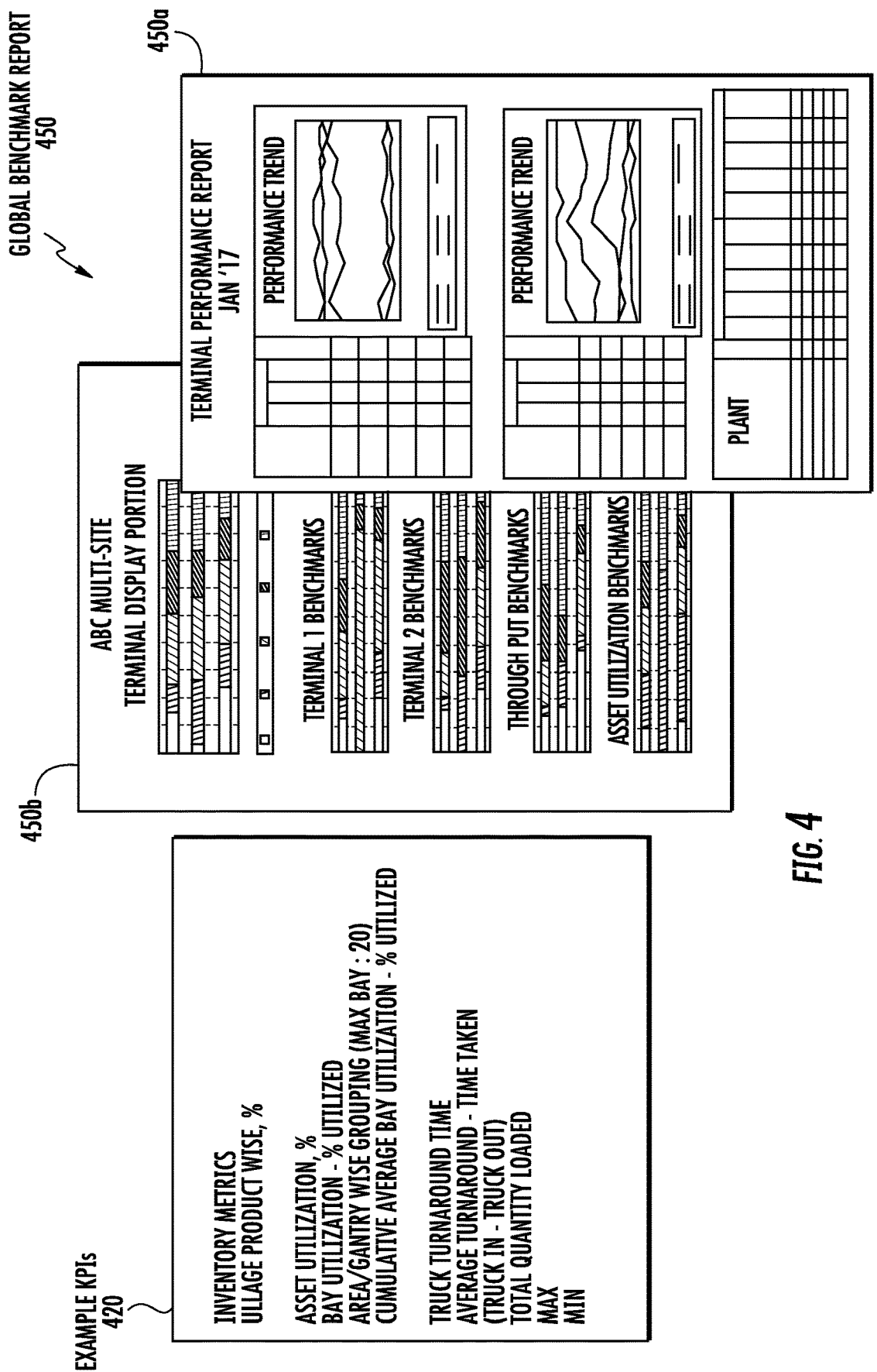
FIG. 4 shows KPIs as well as an example global benchmark system output shown as a global benchmark report.

Disclosed embodiments can build-in continuous automated remote benchmarking into an existing Terminal Manager Application such as the Honeywell TERMINAL MANAGER APPLICATION (TAS). This method is a proven benchmarking method in the Honeywell LOOP SCOUT APPLICATION. Modular analysis supports modes of shipment including truck, rail and marine. KPIs are extendable and customizable to measure overall terminal performance. The frequency of benchmarking reports is user configurable to intervals such as on-demand, hourly, daily, weekly and monthly for continuous improvements. The overall remote benchmarking based on global terminal performance can be compared against both best in class and worst in class terminals. Each of the terminals can be ranked by an aggregate measure (throughput, inventory and operating expense) referred to as attainment. For example, regarding attainment, 0% means all shipments are 'poor', and 100% means all shipments are 'excellent'. Best in class can be defined as the mean of first quartile. Worst in class can be defined as the mean of fourth quartile. Different benchmarks can be sliced such as a Multi-site Terminal Benchmark into respective individual terminal benchmarks (Terminal 1 Benchmark, Terminal 2 Benchmark . . . ), throughput benchmark, asset utilization benchmark, and operating expense benchmark, such as shown in FIG. 4 described below.

Abnormal Situation Management (ASM) Consortium and Engineering Equipment Material Users Association (EE-MUA) guidelines can be leveraged as part of disclosed performance benchmarking. Disclosed benchmarking can also be cloud implemented to provide a secure, scalable infrastructure for collecting, aggregating and storing data, allowing Internet connected "things" to communicate, and providing an offering/SaaS solution, IaaS/PaaS, and data lakes.

Figure 2:
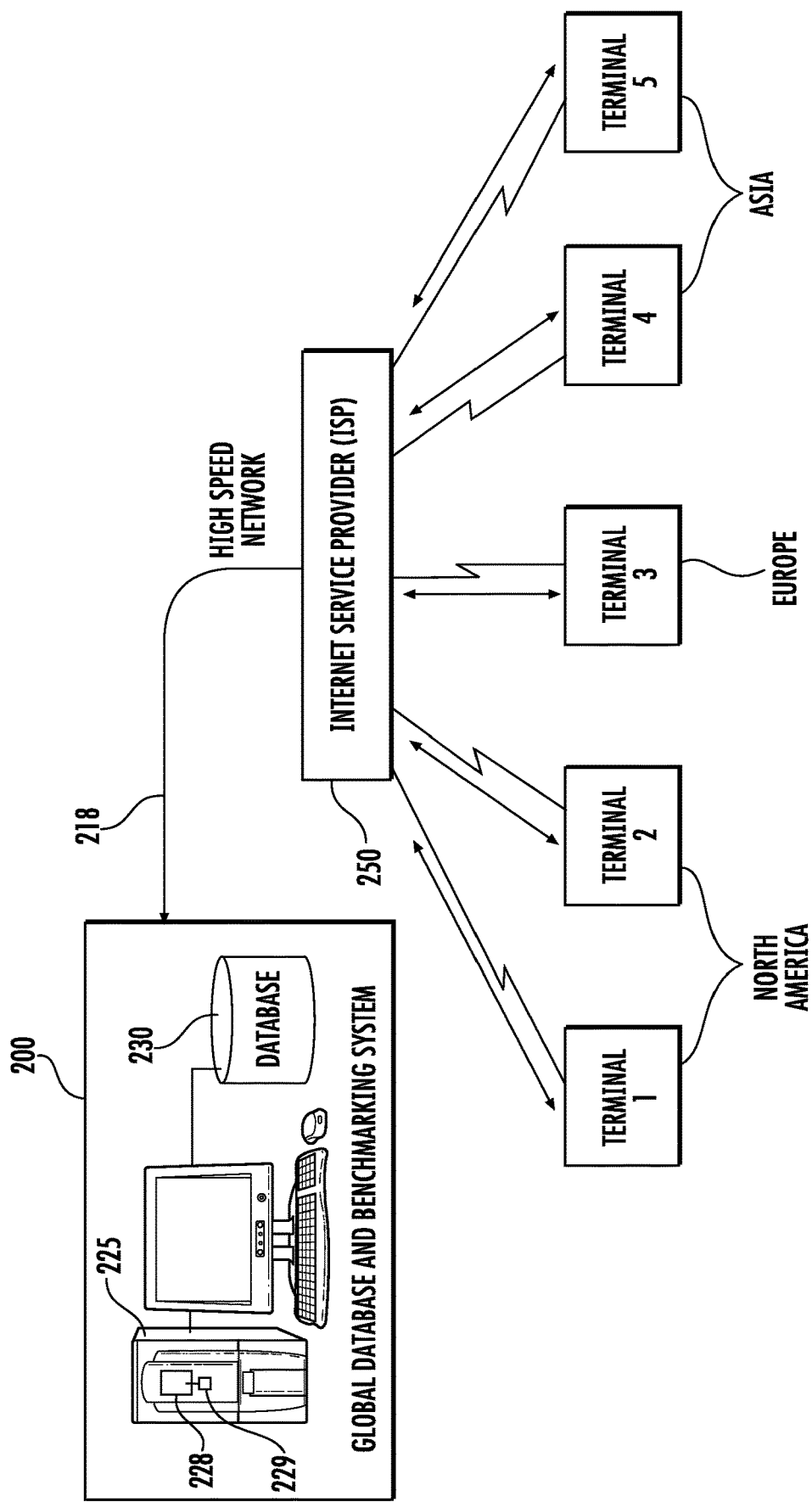
FIG. 2 is a block diagram of an example continuous automated remote global benchmarking system for terminals, according to an example embodiment.

Disclosed embodiments can be applied to generally any bulk liquid terminal. For example petroleum-based processing terminals. FIG. 2 is a block diagram of an example continuous automated remote global benchmarking system 200 for terminals spread across a plurality of continents, such as where the bulk liquid terminals comprises a petroleum-based (e.g. fuel shipping) terminal, according to an example embodiment. The terminals are shown as Terminal 1 and Terminal 2 both being in North America, Terminal 3 being in Europe, and Terminal 4 and Terminal 5 both being in Asia. The terminals are connected to a high speed network 218 (e.g., a T1 (high speed digital network) by an Internet service provider 250 that connects to the global benchmarking system 200.

The global benchmarking system 200 comprises a computing system 225 including a processor 228 having an associated memory 229 coupled to a database in a bulk memory 230 which stores the global raw data received from the respective terminals. Raw data can comprise tank levels, metered inlet flow quantities, and metered outlet flow quantities. Computing system 225 implements a disclosed global benchmarking algorithm.

The global benchmarking system 200 can be located at any of the terminals, or can be remotely located relative to the terminals, such as being cloud-based as described above. In the case the global benchmarking system 200 is remotely located, individuals at the respective terminals can download subscriber software and global raw data.

TAS systems having disclosed global benchmarking can further comprise a training simulator for training terminal operators which simulates actual terminal operations and real conditions including abnormal conditions. The training simulator can be used for new terminal or operations training, abnormal situation training including to reduce terminal operator error. Terminal operator error is known to account for the highest dollar losses per incident in the terminal operations. The training simulator provides needed training for terminal operators regarding how to react and manage abnormal situations for the same reasons airlines train pilots so that their reaction time is rapid to provide a nearly instinctive response. The training simulator can provide training for deemed probable events that cannot be reasonably duplicated in the real terminal.

Disclosed training simulators built into TAS systems enabling more efficient and safer terminal operation. Such training simulators can improve terminal performance. For example, based on benchmark system feedback, the training simulator can improve the business process flow of terminals. In a specific example, a throughput benchmark at a given terminal may be poor compared to the global terminals, where the business process flow of a terminal entity such as entry gate, exit gate, shipment weighment, inspection, loading, can be improved using a disclosed training simulator.

Figure 3:
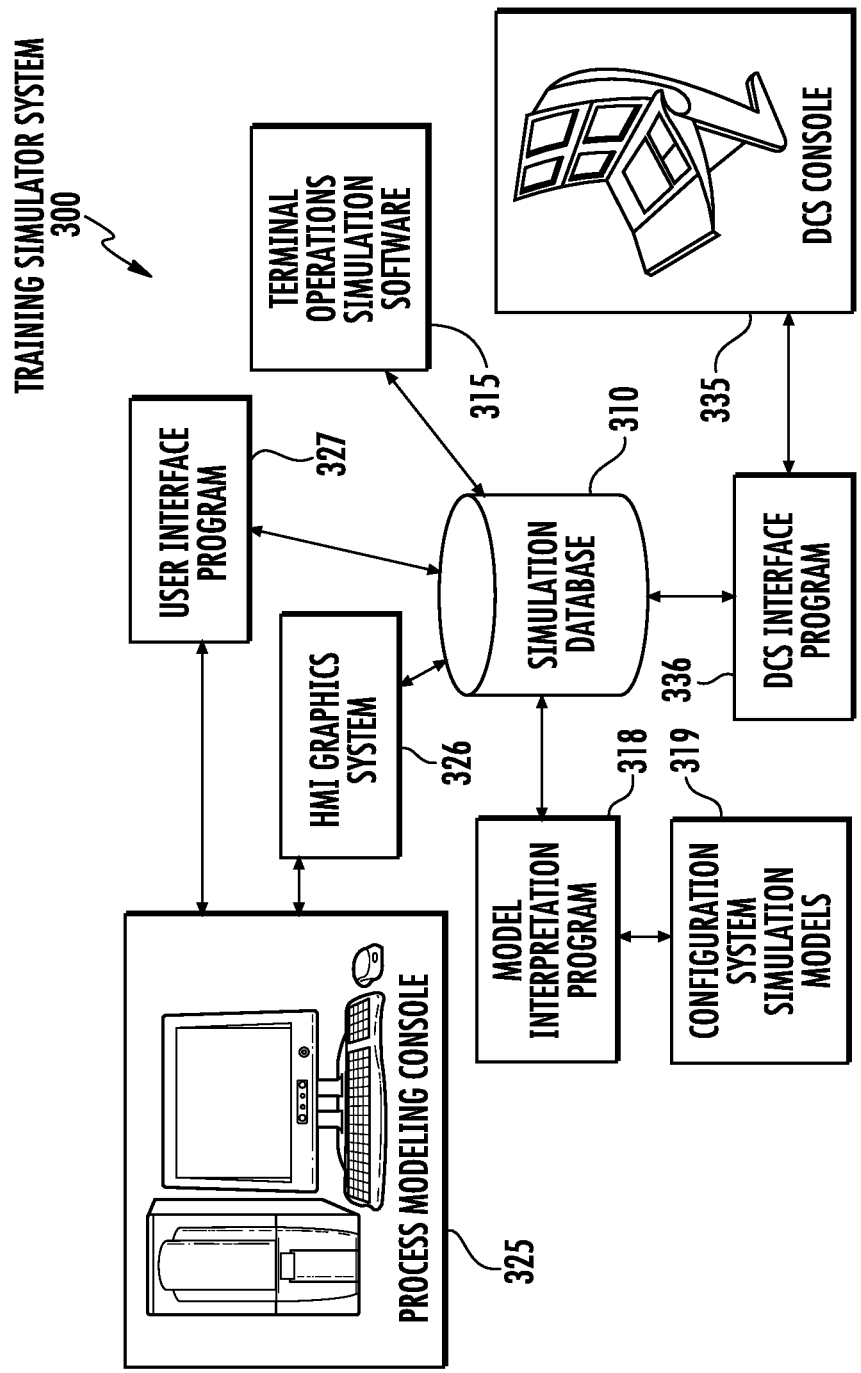
FIG. 3 shows the architecture for an example training simulator system.

FIG. 3 shows the architecture for an example training simulator system 300. The training simulator system 300 is shown including a simulation database 310 that is coupled to terminal operations simulation software 315 and model interpretation program 318 that is coupled to a configuration system simulation models 319. Simulation database 310 can reside in the bulk memory 230 shown in FIG. 2 and the computing system 225 shown in FIG. 2 can implement the other blocks of the training simulator system 300.

Simulation database 310 includes set of model flow sheets, connectivity between unit operations, unit operations parameters and variables. Simulation software 315 includes calculation engine processes data and calculates variables based on the user actions. Model interpretation program 318 validates user constructed model and ensures model configurations are properly defined. The configuration system simulation models 319 defines a model flow sheet, connectivity between unit operations, unit operations parameters and variables. Both the model interpretation program and configuration system simulation models are used during the initial model construction stage.

The simulation database is made available to users at a process modeling console 325 through a Human-machine interface (HMI) graphics system 326 (for field operation user actions) and a user interface program 327 (training administration), and to users at a distributed control system (DCS) console 335 (for panel operation user actions) through a DCS interface program 336. Process modeling software run by process modeling console 325 can comprise Honeywell's UNISIM Design Suite which helps engineers create steady-state and dynamic models for plant design, performance monitoring, troubleshooting, business planning, and asset management.

EXAMPLES

Disclosed embodiments are further illustrated by the following specific Examples, which should not be construed as limiting the scope or content of this Disclosure in any way.

Regarding disclosed training simulators, as described above operators can be trained to perform end-to-end terminal operations in both normal scenarios and abnormal scenarios. In a normal scenario, training can be covered right from order creation, authorization at entry and exit gate, weighment, bay queue allocation, loading, printing bill of laden and order closure. In an abnormal scenario, training can be covered to manage and take an immediate next step in any of the failure or upset conditions for a terminal entity.

FIG. 4 shows some example KPIs 420 as well as an example output from a disclosed global benchmark system shown as a benchmark report 450 for ABC Company's multi-site terminals that generally span several continents. An example terminal performance report 450a is shown, as well as an example multi-site terminal portion 450b with an x-axis being % of loops. The example KPIs 420 shown include inventory metrics, asset utilization and turnaround time.

The multi-site terminal portion 450b is shown providing overall terminal benchmarking for ABC's multi-site terminals, and data from terminal 1 benchmarks, terminal 2 benchmarks, throughput benchmarks, and asset utilization benchmarks. For the Terminal 1 Benchmark and Terminal 2 Benchmark, the aggregate attainment of Terminal 1 and Terminal 2 is benchmarked against best in class (top) and worst class (bottom) terminals for ABC. Similarly, a throughput benchmark and asset utilization benchmark are each measured against respective parameters.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of automated remote terminal benchmarking, comprising:
  providing a computing system including a processor having an associated memory which implements a benchmarking algorithm, said benchmarking algorithm:
   receiving raw data associated with a plurality of Key Performance Indicators (KPIs) including real-time data from different bulk liquid storage terminals spanning sites across a plurality of continents;
   calculating a global target benchmark value or global target benchmark range for at least a first of said plurality of KPIs (first KPI) from said raw data;
   generating a benchmark report which benchmarks a KPI performance of a first terminal of said bulk liquid storage terminals including for said first KPI by a comparison to said global target benchmark value or to said global target benchmark range, and
   wherein said benchmarking algorithm further implements a training simulator for said user that simulates actual terminal operations, real conditions, and abnormal conditions including alarm conditions.

2. The method of claim 1, wherein said computing system is remotely located relative to said first terminal.

3. The method of claim 2, wherein said computing system is cloud located.

4. The method of claim 1, wherein said bulk liquid storage terminals comprise a petroleum-based terminal.

5. The method of claim 1, wherein said bulk liquid storage terminals are involved in modes of transport selected from surface, rail, marine and pipeline.

6. The method of claim 1, wherein said global target benchmark value or global target benchmark range are based on a best in class performance and a worst in class performance of said bulk liquid storage terminals.

7. A continuous automated remote global benchmarking system for terminals, comprising:
  a computing system including a processor having an associated memory which implements a benchmarking algorithm, said benchmarking algorithm:
   receiving raw data associated with a plurality of Key Performance Indicator (KPIs) from different bulk liquid storage terminals spanning across a plurality of continents;
   real-time calculating a global target benchmark value or global target benchmark range for at least a first of said plurality of KPIs (first KPI) from said raw data;

generating a benchmark report which benchmarks a KPI performance of a first terminal of said bulk liquid storage terminals including for said first KPI by a comparison to said global target benchmark value or to said global target benchmark range, and wherein said benchmarking algorithm further implements a training simulator for said user that simulates actual terminal operations, real conditions and abnormal conditions including alarm conditions.

8. The system of claim 7, said global target benchmark value or global target benchmark range are based on a best in class performance and a worst in class performance of said bulk liquid storage terminals.

* * * * *